(12) United States Patent
Bowlby et al.

(10) Patent No.: US 12,715,522 B2
(45) Date of Patent: Aug. 25, 2026

(54) UNDERBODY STRUCTURE FOR A VEHICLE

(71) Applicant: Honda Motor Co., Ltd., Tokyo (JP)

(72) Inventors: Benjamin Bowlby, Dublin, OH (US); Pirooz Moradnia, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 388 days.

(21) Appl. No.: 18/392,190

(22) Filed: Dec. 21, 2023

(65) Prior Publication Data

US 2025/0206388 A1 Jun. 26, 2025

(51) Int. Cl.

*B62D 35/00* (2006.01)
*B62D 25/24* (2006.01)
*B62D 29/04* (2006.01)

(52) U.S. Cl.

CPC .......... *B62D 35/005* (2013.01); *B62D 25/24* (2013.01); *B62D 29/041* (2013.01)

(58) Field of Classification Search

CPC .... B62D 35/005; B62D 25/24; B62D 29/041; B62D 35/02; B62D 37/02; B60R 19/48; B60R 19/54; B60R 19/56; B60R 2019/264; B20R 19/486

See application file for complete search history.

(56) References Cited

U.S. PATENT DOCUMENTS

| | | | |
|---|---|---|---|
| 8,276,972 B2 | 10/2012 | Domo et al. | |
| 10,173,736 B2 | 1/2019 | Ribaldone et al. | |
| 10,214,255 B1 | 2/2019 | Suzuka | |
| 10,953,934 B2 | 3/2021 | Herlem | |
| 2006/0214439 A1* | 9/2006 | Reynolds | B60R 19/18 293/132 |
| 2022/0033015 A1 | 2/2022 | Ambo et al. | |
| 2023/0166801 A1 | 6/2023 | Ando et al. | |

FOREIGN PATENT DOCUMENTS

JP H01169463 U * 11/1989

* cited by examiner

*Primary Examiner* — Amy R Weisberg
*Assistant Examiner* — Alma D. Schuster
(74) *Attorney, Agent, or Firm* — Morgan Lincoln; American Honda Motor Co., Ltd.

(57) ABSTRACT

An underbody structure for a vehicle for guiding air underneath the vehicle is disclosed includes a frame having an arcuate structure with a first surface defining a cavity. The underbody structure also includes a panel arranged inside the cavity and adapted to compress under a compression loading and flex back in response to a removal of the compression loading. The panel is arranged between the frame and the underside of the vehicle in an assembly of the underbody structure to the vehicle.

13 Claims, 4 Drawing Sheets

UNDERBODY STRUCTURE FOR A VEHICLE

BACKGROUND

The disclosed subject matter relates generally to a vehicle. More particularly, the disclosed subject matter relates to an underbody structure of a vehicle that guides airflow along an underside of the vehicle.

Aerodynamic structures are generally mounted on the vehicle at various positions to enable and control an aerodynamic flow of air above the vehicle and along the sides of the vehicle.

SUMMARY

In accordance with one embodiment of the present disclosure, an underbody structure for a vehicle for guiding air underneath the vehicle is disclosed. The underbody structure comprises a frame having an arcuate structure with a first surface defining a cavity. The underbody structure also includes a panel arranged inside the cavity and adapted to compress under a compression loading and flex back in response to a removal of the compression loading. The panel is arranged between the frame and an underside of the vehicle in an assembly of the underbody structure to the vehicle.

In accordance with another embodiment of the present disclosure, a vehicle is disclosed. The vehicle comprises a vehicle body having an underside arranged facing a surface of travel of the vehicle, and an underbody structure pivotally attached to the vehicle body and disposed underneath the underside of the vehicle body. The underbody structure includes a frame extending in a longitudinal direction and having a first end pivotally attached to the vehicle body and configured to pivot between an extended position and a retracted position. The underbody structure also includes a panel attached to the frame and arranged between the frame and the underside of the vehicle. The panel is adapted to compress under a compression loading and flex back in response to a removal of the compression loading to move the frame to the extended position.

In accordance with yet a further embodiment of the present disclosure, a vehicle is disclosed. The vehicle comprises a vehicle body having an underside arranged facing a surface of travel of the vehicle, and an underbody structure pivotally attached to the vehicle body and disposed underneath the underside of the vehicle body. The underbody structure includes a frame having a first end pivotally attached to the vehicle body and a second end arranged separated from the vehicle body. The frame includes an arcuate structure extending from the first end towards the second end of the frame with a first surface defining a cavity, and a bent structure extending from the arcuate structure to the second end of the frame. The bent structure extends in a vertical direction covering an opening of the cavity defined at an interface of the arcuate structure and the bent structure. The underbody structure also includes a panel attached to the arcuate structure and arranged inside the cavity, contacting the underside of the vehicle body. The panel is adapted to compress under a compression loading and flex back in response to a removal of the compression loading.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-4, wherein like numbers indicate the same or corresponding elements throughout the views.

Figure 1:
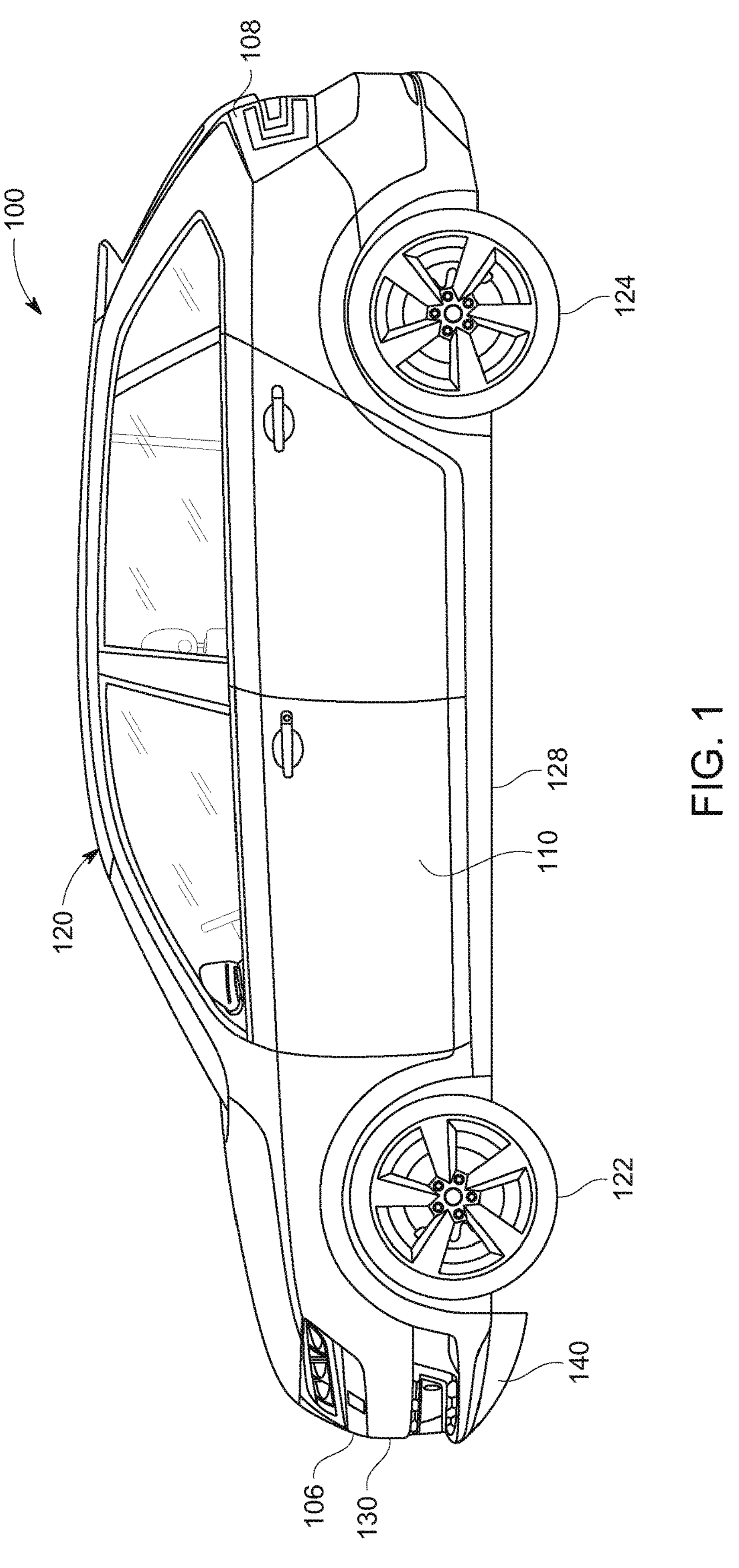
FIG. 1 is a perspective view of a vehicle having an underbody structure, in accordance with one embodiment of the present disclosure.

FIG. 1 illustrates a perspective view of a vehicle 100, in accordance with one embodiment of the present disclosure. The vehicle 100 in accordance with embodiments can comprise any variety of vehicles, including multi-utility vehicles, sport utility vehicles, jeeps, truck, hatchback, sedan, etc., for example. The vehicle 100 includes a front end 106, a rear end 108, a first longitudinal side 110 (hereinafter referred to as a left side 110), a second longitudinal side (not shown), and a vehicle body 120 extending from the front end 106 to the rear end 108 and supported on a plurality of wheels including front wheels 122 and rear wheels 124. Further, the vehicle body 120 includes an underside 128 arranged facing a surface on which the vehicle 100 travels, and a front bumper 130 arranged at the front end 106 of the vehicle 100. Moreover, the vehicle 100 includes an underbody structure 140 pivotally coupled to the vehicle body 120 and extending downwardly of the underside 128 of the vehicle body 120.

Figure 2:
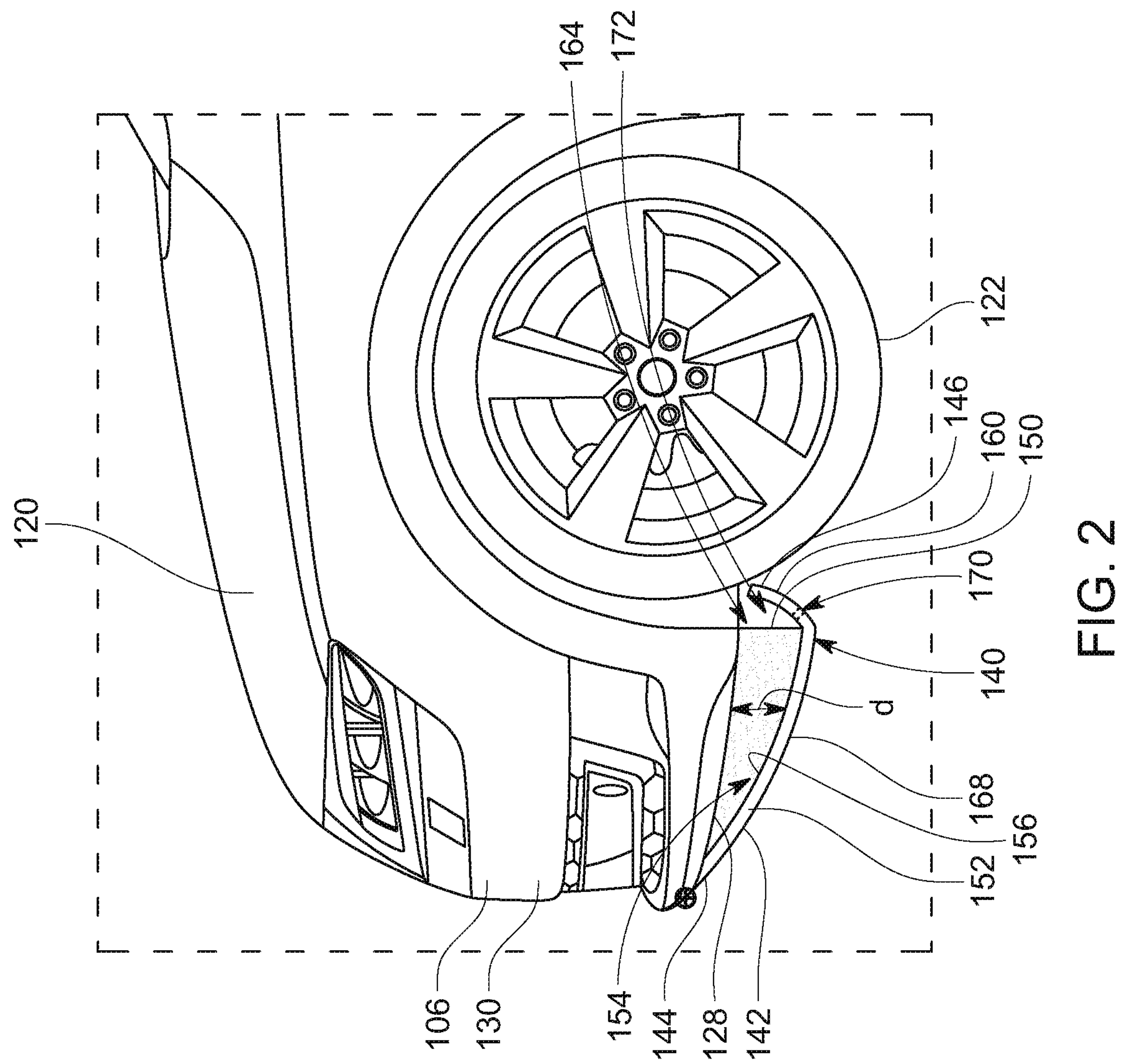
FIG. 2 is an enlarged view of a portion of the vehicle depicting a frame of the underbody structure of FIG. 1 arranged in an extended position, in accordance with one embodiment of the present disclosure.
Figure 3:
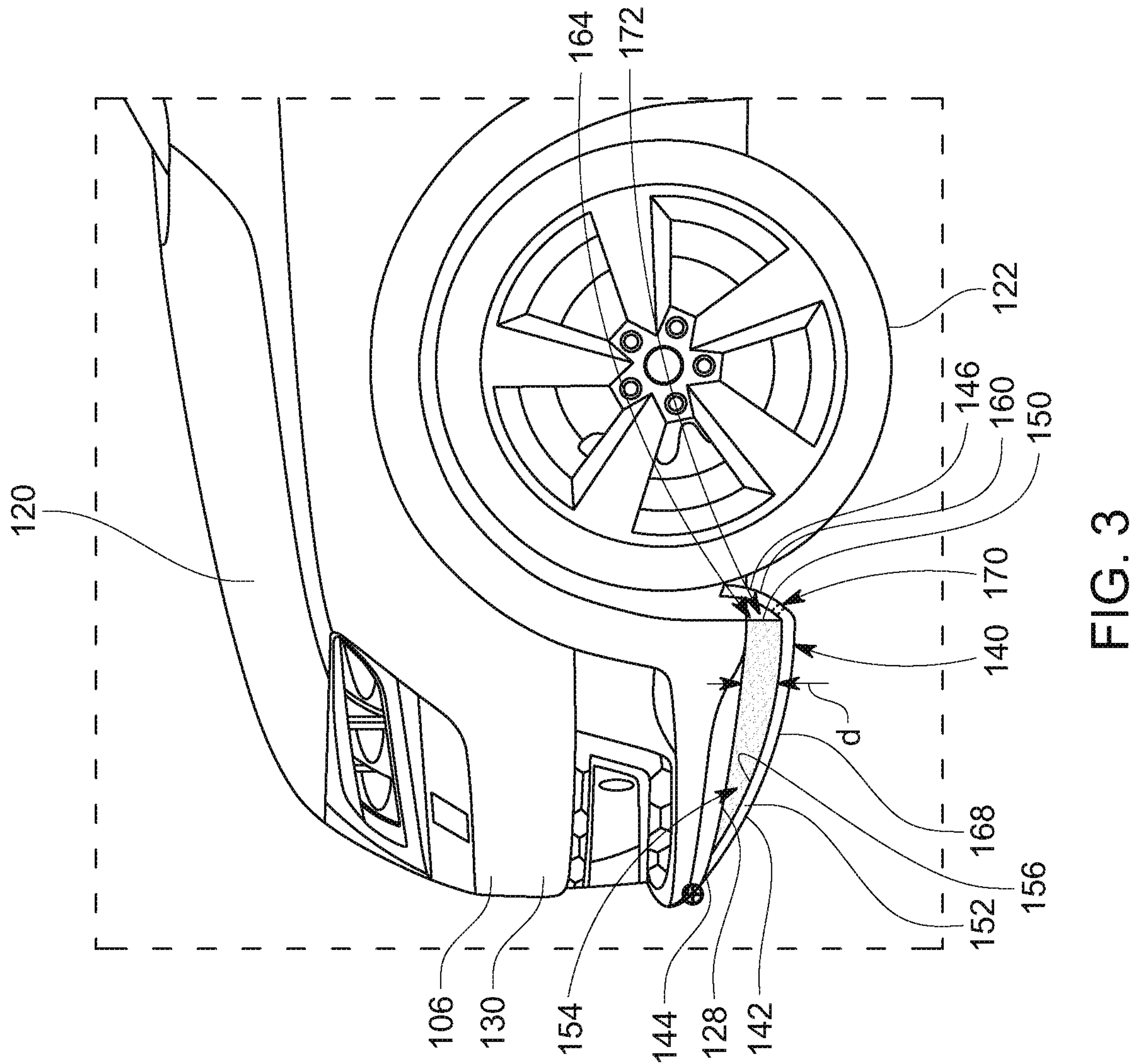
FIG. 3 is an enlarged view of a portion of the vehicle depicting the frame of the underbody structure of FIG. 1 arranged in a retracted position, in accordance with one embodiment of the present disclosure.

Referring to FIGS. 2 and 3, the underbody structure 140 extends from the front end 106 towards the rear end 108 in a longitudinal direction of the vehicle 100, and includes a frame 142 having a first end 144 pivotally coupled to the front bumper 130 (i.e., vehicle body 120) and a second end 146 arranged distally from the front bumper 130. As shown, the frame 142 is configured to pivot about a horizontal axis (i.e., pivot axis) that may extend in a lateral direction of the vehicle 100. The frame 142 is configured to pivot about the pivot axis between a first position (i.e., extended position), shown in FIG. 2 and second position (i.e., a retracted position), shown in FIG. 3. It may be appreciated that the frame 142 is biased in the extended position and is displaced to the retracted position in response to an upward force applied on the frame 142, for example, when an obstacle hit the frame 142 during a motion of the vehicle 100. In the first position, a distance ‘d’ of the frame 142 from the underside 128 of the vehicle body 120 is larger than in the second position. Accordingly, the frame 142 moves towards the underside 128 of the vehicle body 120 when displaced from the first position to the second position. It may be appreciated that the frame 142 is moves to the extended position upon removal of compression force due to its own weight. In some embodiments, a spring may be arranged to bias the frame 142 the extended position.

Further, as shown, the underbody structure 140 includes a panel 150 arranged between the frame 142 and the underside 128 of the vehicle body in a vertical direction and attached to the frame 142. In some embodiments, the panel 150 is arranged abutting the underside 128 of the vehicle body 120 in the extended position of the frame 142. Accordingly, the panel 150 is compressed upon movement of the frame 142 towards the retracted position from the extended position. To facilitate such a compression and flexing back of the panel 150, the panel 150 may be made of a compressible or deformable material that regains its shape upon removal of the compression force. In some embodiments, the panel 150 may be made of a rubber, plastic or similar material that deforms/compress under force and regain its original shape upon removal of the deforming/compressing force.

To facilitate a retention of the panel 150 with the frame 142, the frame 142 includes an arcuate structure 152 that defines a cavity 154 and the panel is arranged inside the cavity 154 between an upper surface 156 of the arcuate structure 152 and the underside 128 of the vehicle body 120. Further, in some embodiments, shown in FIGS. 2 and 3, the frame 142 includes a bent structure 160 extending from the arcuate structure 152 to the second end 146. As shown, the bent structure 160 extends in a substantially vertical direction from the arcuate structure 152 to the second end, closing an opening 164 of the cavity 154 located at an interface of the arcuate structure 152 and the bent structure 160. It may be appreciated that the bent structure 160 includes a curved shape with a lower surface 168 of the frame 142 at a junction of the arcuate structure 152 and the bent structure 160 having a curve with a suitable radius so as to enable a smooth and gradual transition between the arcuate structure 152 and the bent structure 160. The curve at the junction of the arcuate structure 152 and the bent structure 160 enables the obstacle to pivot the frame 142 upwardly during a reverse motion of the vehicle 100 without causing the obstacle to be stuck with the bent structure 160. Accordingly, the frame 142 is shaped such that the frame 142 pivots towards the retracted position when the obstacle contacts the frame 142 irrespective of a direction of motion of the vehicle 100. Also, in some embodiments, the frame 142 is made of non-compressible/non-deformable material.

Moreover, in some embodiments, the frame 142 defines at least one hole/drain opening 170 arranged proximate to the interface/junction of the arcuate structure 152 and the bent structure 160 and extending from the upper surface 156 to the lower surface 168 of the frame 142. The at least one hole/drain opening 170 acts as a drainage hole to drain any water or snow or mud or the like, inside a space 172 defined between the bent structure 160 and the panel 150, and thereby prevents accumulation of the water inside the underbody structure 140. Moreover, the second end 146 of the frame 142 is arranged between the front wheel 122 and a rear end of the front bumper 130 in the longitudinal direction.

Figure 4:
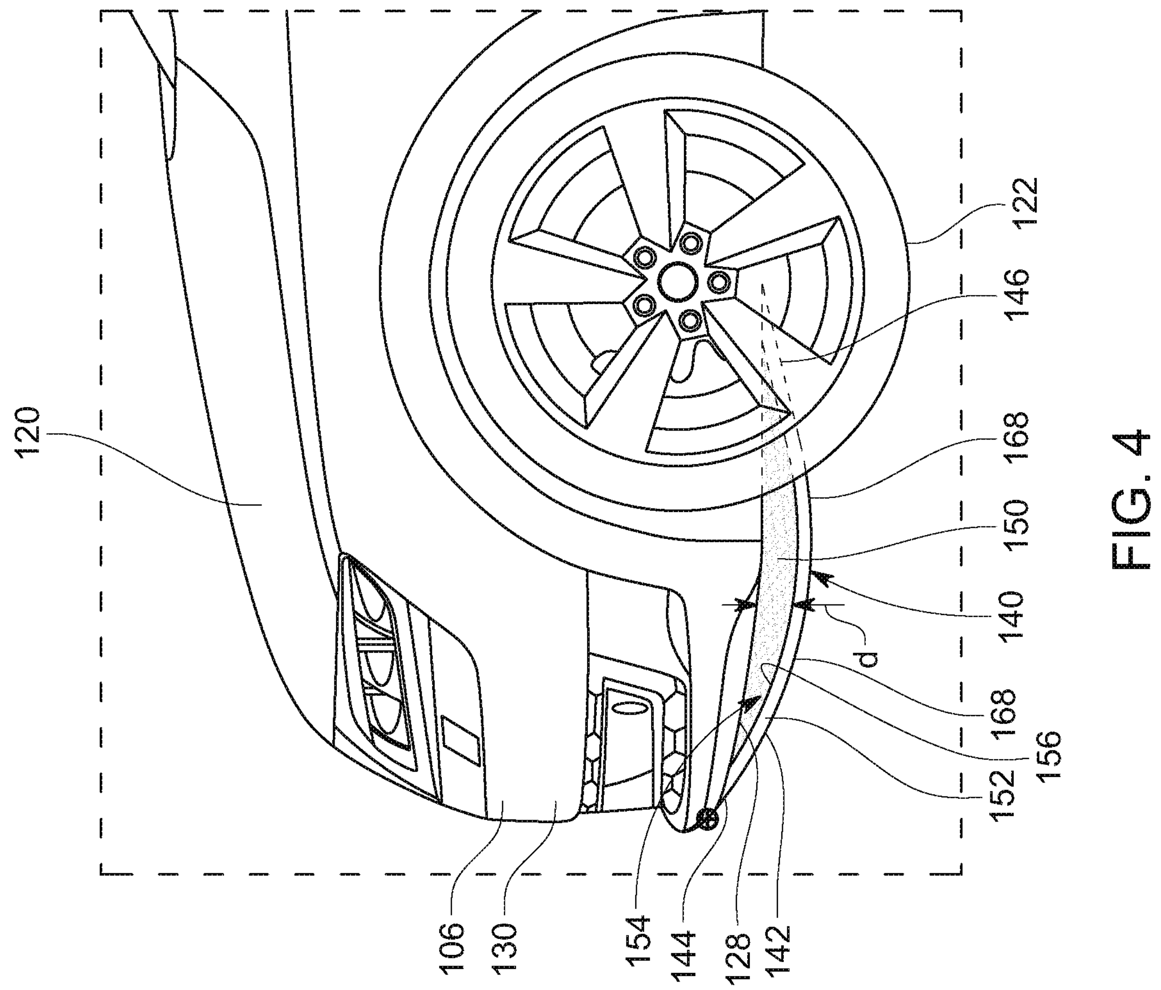
FIG. 4 is an enlarged view of a portion of the vehicle depicting an underbody structure, in accordance with one embodiment of the present disclosure.

In some embodiments, as shown in FIG. 4, the bent structure 160 is omitted, and the arcuate structure 152 includes a shape such that the lower surface 168 includes a substantially convex shape and the second end 146 is arranged at a location that is proximate to an axle of the front wheel 122, as shown in FIG. 4

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle, comprising:

a vehicle body having an underside arranged facing a surface of travel of the vehicle; and an underbody structure pivotally attached to the vehicle body and disposed underneath the underside of the vehicle body, the underbody structure includes a frame extending in a longitudinal direction and having a first end pivotally attached to the vehicle body and configured to pivot between an extended position and a retracted position, and a panel attached to the frame and arranged between the frame and the underside of the vehicle, wherein the panel is adapted to compress under a compression loading and flex back in response to a removal of the compression loading to move the frame to the extended position.

2. The vehicle of claim 1, wherein in the extended position, the frame is arranged distally from the underside of the vehicle body relative to the retracted position, and in the retracted position, the frame compresses the panel and is arranged proximally to the underside of the vehicle.

3. The vehicle of claim 1, wherein a second end of the frame is arranged separated from the underside of the vehicle.

4. The vehicle of claim 3, wherein the frame includes an arcuate structure extending from the first end towards the second end of the frame and defines a cavity with the panel arranged inside the cavity, contacting the underside of the vehicle body, and a bent structure extending from the arcuate structure to the second end of the frame and extends in a vertical direction covering an opening of the cavity defined at an interface of the arcuate structure and the bent structure.

5. The vehicle of claim 4, wherein the bent structure includes a curved shape.

6. The vehicle of claim 1, wherein the frame defines a plurality of drain openings to enable a discharge of water from the underbody structure.

7. The vehicle of claim 1, wherein the panel is made of a deformable material.

8. The vehicle of claim 7, wherein the deformable material includes rubber.

9. A vehicle, comprising:

a vehicle body having an underside arranged facing a surface of travel of the vehicle; and an underbody structure pivotally attached to the vehicle body and disposed underneath the underside of the vehicle body, the underbody structure includes a frame having a first end pivotally attached to the vehicle body and a second end arranged separated from the vehicle body, the frame includes an arcuate structure extending from the first end towards the second end of the frame with a first surface defining a cavity, and a bent structure extending from the arcuate structure to the second end of the frame, wherein the bent structure extends in a vertical direction covering an opening of the cavity defined at an interface of the arcuate structure and the bent structure, and a panel attached to the arcuate structure and arranged inside the cavity, contacting the underside of the vehicle body, wherein the panel is adapted to compress under a compression loading and flex back in response to a removal of the compression loading.

10. The vehicle of claim 9, wherein the frame is configured to move between an extended position and a retracted position, in the extended position, the frame is arranged distally from the underside of the vehicle body relative to the retracted position, and in the retracted position, the frame compresses the panel and is arranged proximally to the underside of the vehicle.

11. The vehicle of claim 9, wherein the vehicle body includes a front bumper and the frame is pivotally coupled to the front bumper and extends rearwardly in a longitudinal direction from the front bumper.

12. The vehicle of claim 9, wherein the frame defines a plurality of drain openings to enable a discharge of water from the underbody structure.

13. The vehicle of claim 9, wherein the panel is made of a deformable material.

* * * * *